United States Patent [19]
Kulkarny

[11] 4,360,922
[45] Nov. 23, 1982

[54] PRESSURE WAVE CHARGED REPETITIVELY PULSED GAS LASER

[75] Inventor: Vijay A. Kulkarny, Redondo Beach, Calif.

[73] Assignee: The United States of America as represented by the United States Department of Energy, Washington, D.C.

[21] Appl. No.: 201,959

[22] Filed: Oct. 29, 1980

[51] Int. Cl.³ .............................................. H01S 3/03
[52] U.S. Cl. ...................................... 372/59; 372/29; 372/72; 372/55
[58] Field of Search ...................... 331/94.5 G, 94.5 P

[56] References Cited

U.S. PATENT DOCUMENTS

| | | | |
|---|---|---|---|
| 3,921,100 | 11/1975 | Olinger, Jr. et al. | 331/94.5 G |
| 3,982,208 | 9/1976 | Camac | 331/94.5 G |
| 4,229,709 | 10/1980 | McMahan | 331/94.5 G |
| 4,283,686 | 8/1981 | Daugherty et al. | 331/94.5 G |

OTHER PUBLICATIONS

"Possibility of Spontaneous Circulation of a Gas Mixture in a Pulsed-Periodic Laser" by Gubarev, et al., *Sov. Jour. Quant. Elect.* 8 (No. 7) Jul. 1978, p. 912.

Primary Examiner—William L. Sikes
Assistant Examiner—Leon Scott, Jr.

[57] ABSTRACT

A repetitively pulsed gas laser in which a system of mechanical shutters bracketing the laser cavity manipulate pressure waves resulting from residual energy in the cavity gas following a lasing event so as to draw fresh gas into the cavity and effectively pump spent gas in a dynamic closed loop.

9 Claims, 2 Drawing Figures

PRESSURE WAVE CHARGED REPETITIVELY PULSED GAS LASER

FIELD OF THE INVENTION

The present invention relates to repetitively pulsed gas lasers of the type wherein a gas lasing medium is circulated in a closed loop through a laser cavity, and more particularly to a method and apparatus for circulating the gas lasing medium.

BACKGROUND OF THE INVENTION

In high energy repetitively pulsed gas lasers, efficiency, repetition rate and beam quality are important considerations but are elusive in practice. Conventional repetitively pulsed gas lasers employ a pump or the like for directing a continuous flow of gas through the lasing cavity. See, for example, U.S. Pat. Nos. 3,886,481; 4,000,477; 4,005,374; 4,031,484 and 4,118,592. Since it it desirable to have the gas quiescent and uniform in the lasing cavity at the time of discharge, acoustic suppressor and absorber elements are often employed, with consequent increase in resistance to gas flow. Additionally, interaction of gas pressure waves with acoustic and flow-directing elements may produce inhomogeneities in the lasing medium, which would necessitate low repetition rate to obtain reasonable beam quality. Moreover, substantial energy is required for operation of pumping, heat exchange and/or reconditioning of the gas, which leads to reduced overall efficiency.

Gubarev et al, "Possibility of Spontaneous Circulation of a Gas Mixture in a Pulse-Periodic Laser," Sov. J. Quan. Elec., July 1978, suggests that pressure waves resulting from residual thermal energy in the laser cavity may be employed for stimulating gas circulation by disposition of a gas valve upstream of the laser cavity and an acoustic resonator downstream of the lasing cavity. The gas valve is to be manipulated as a function of shock wave travel within the resonator for drawing fresh gas through the valve into the discharge cavity.

An object of the present invention is to provide a method and apparatus for circulating the lasing medium in a repetitively pulsed gas laser which minimizes or overcomes the above-noted difficulties in the prior art. A more specific object of the invention is to provide improved method and apparatus of the described type which manipulate the pressure waves generated by residual thermal energy in the cavity gas for effecting gas circulation, while maintaining the lasing gas in the cavity substantially quiescent and uniform during the lasing event.

SUMMARY OF THE INVENTION

In accordance with the present invention, mechanical shutters are positioned upstream and downstream of the lasing cavity, and are manipulated in sequence to utilize the pressure waves resulting from residual energy in the cavity gas to control gas flow. Pressure waves which would produce density gradients are isolated from the cavity by the shutters, thereby reducing problems associated with gas inhomogeneities during the lasing event. The shutters are operated in a static medium between pressure pulses, and thus themselves produce no additional disturbances.

BRIEF SUMMARY OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENT

Figure 1:
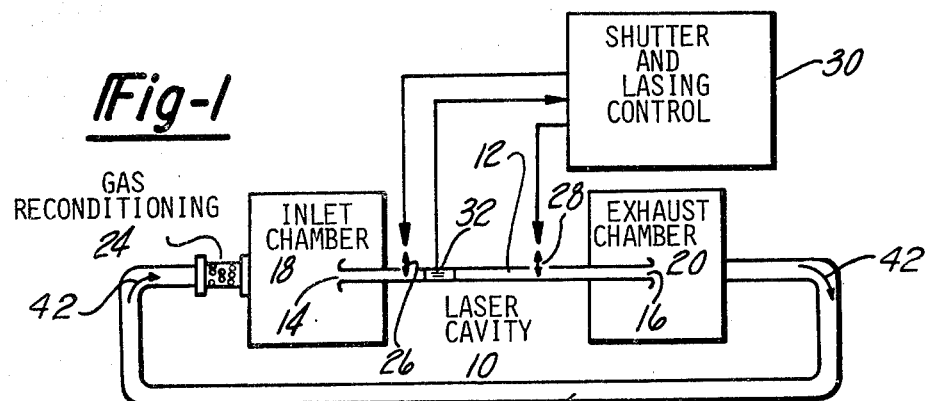
FIG. 1 is a schematic diagram of a gas dynamic laser system in accordance with the invention.

Referring to FIG. 1, a gas dynamic laser system in accordance with the invention comprises a laser cavity 10 in a laser duct 12 having open upstream and downstream ends 14,16 respectively disposed in an inlet chamber 18 and an exhaust chamber 20. A conduit 22 connects chambers 18,20 in a closed loop or path. A gas reconditioning device 24 is connected in conduit 22. Such reconditioning device may take the form of a simple heat exchanger for a carbon dioxide laser, or of a more complex chemical or catalytic purification or regeneration device in the case of a hydrogen fluoride laser, for example. A pair of high-speed gas valves, gates or shutters reciprocating, rotary or otherwise 26,28 are disposed in duct 12 respectively upstream and downstream of cavity 10 between the cavity and the respective duct ends 14,16. Upstream shutter 16 is preferably disposed closely adjacent to cavity 10, while downstream shutter 28 is spaced along duct 12 at a chosen distance from cavity 10. Shutters 26,28 are operated and synchronized by a control unit 30 which is also coupled to lasing initiation mechanism illustrated schematically at 32 within cavity 10.

The lasing initiation mechanism may consist of electric discharge electrode or electron beam for a carbon dioxide laser, or an electron beam or flashlamps for a hydrogen fluoride laser, for example. The synchronization signal may be obtained directly by electrical contact with the lasing initiation mechanism or indirectly through an initiation sensor responding to pressure, temperature or radiation from the initiation of the laser gas.

Figure 2:
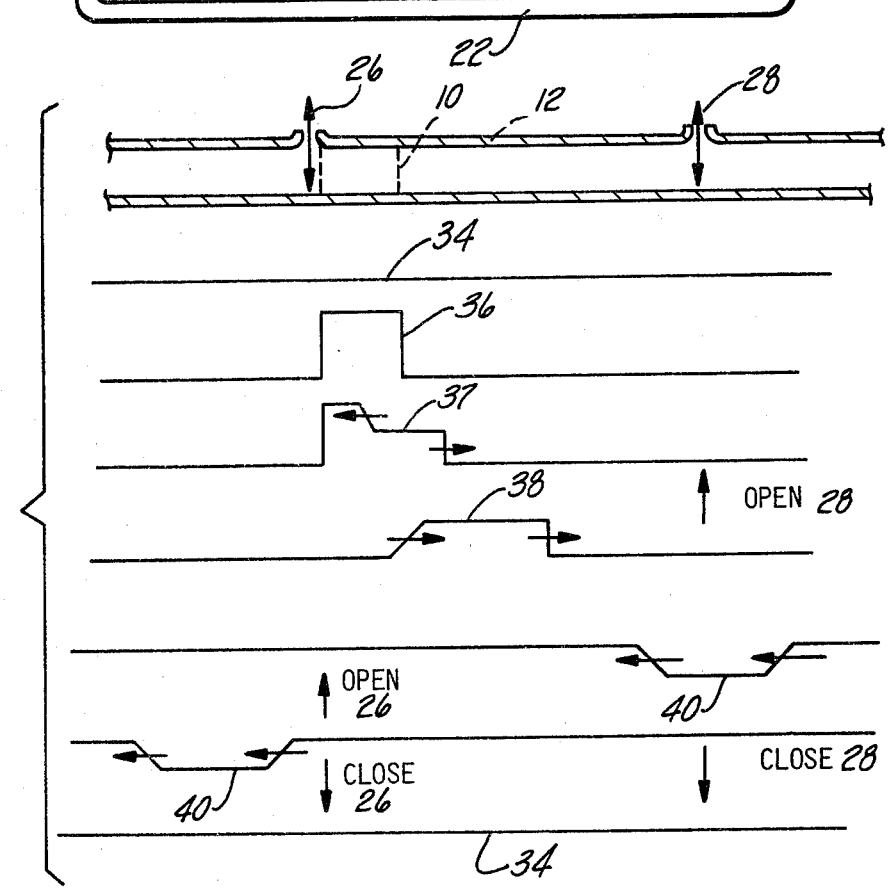
FIG. 2 is a diagram illustrating pressure profiles in the laser cavity which are useful in understanding operation of the invention.

FIG. 2 illustrates the basic sequence of operation of the invention. In FIG. 2, the top illustration is a schematic representation of cavity 10 and shutters 26,28 in duct 12, and the lower illustrations successively depict sequential pressure waves traveling in duct 12 during operation. In each of such lower illustrations, the abscissa indicates position along duct 12 while the ordinate indicates pressure. Initially, with both shutters 26,28 closed, gas pressure is stable across cavity 10 and duct 12 as shown at 34. When a lasing event is initiated in cavity 10 by the mechanism 32 (FIG. 1), residual thermal energy in the lasing medium causes a local increase in cavity pressure, resulting in a top-hat form of pressure profile 36. Since shutter 26 is closed, pressure profile 36 develops as at 37 into a compression pulse 38 which travels toward shutter 28 and produces downstream motion in the gas. In the meantime, shutter 28 is opened so that the pulse 38 travels to the open end 16 (FIG. 1) of duct 12 and is reflected therefrom in the form of a rarefaction or expansion pulse 40 traveling upstream toward chamber 18 (FIG. 1) and producing additional downstream motion of the gas. Shutter 26 is now opened to permit passage of expansion pulse 40 therethrough, thus pulling fresh medium into cavity 10. Both shutters 26,28 can then be closed. The pressure now is stable at 34 preparatory to initiation of a subsequent lasing event. As will be evident, periodic repetition of the foregoing sequence has the overall effect of circulating gas in the laser system in the direction 42 in FIG. 1.

As a modification, shutter 26 may be left open after passage of expansion pulse 40 (FIG. 2) which will be reflected by an open duct end at 14 (FIG. 1) as a second compression pulse traveling downstream—i.e. in the direction of exhaust chamber 20. Such a pulse would effectively push more fresh gas into the laser cavity. The second compression pulse may be permitted to pass through shutter 28 (open) and trapped in chamber 20 (FIG. 1). Both shutters 26,28 can then be closed in preparation for the subsequent lasing event. This modification enhances gas motion at the expense of additional delay between pulses. Thus, more gas can be drawn through the cavity, but the pulse repetition rate will be lower. It is possible to allow more cycles of this modification to occur between lasing pulses or events, which would produce more gas flow between lasing pulses, but the pulses would then occur at an even slower rate. In a different version of the modification, the compression pulse traveling downstream through the open shutter 26 may be trapped by closing shutters 26 and 28. The pulse would then reflect from shutter 28 and then from shutter 26. During the latter reflection, the gas in the laser cavity is momentarily precompressed. Initiation of the subsequent lasing event at this instant will increase laser efficiency.

Thus, there has been provided in accordance with the invention a method and apparatus for improved pumping of lasing medium in a pulse-periodic gas laser which fully satisfies all of the objects and aims previously set forth. Residual thermal energy stored in the gas medium following a lasing event is used for pumping fresh gas into the lasing cavity. In addition to eliminating separate pump units characteristic of the prior art, thereby increasing overall system efficiency, the invention also serves to reduce gas density gradients within the lasing cavity which helps eliminate gas inhomogeneities. The shutters themselves are operated when the gas immediately around the shutters is static (FIG. 2) so as to reduce disturbances.

What is claimed is:

1. In a repetitively pulsed gas laser comprising a lasing cavity in a laser duct having open upstream and downstream ends, means for initiating a lasing event in said cavity and means for defining a closed loop gas path including inlet and exhaust chambers connected to said duct ends, the improvement comprising first and second gas shutter means for opening and closing said duct to the passage of gas and pressure pulses therethrough disposed in spaced relation along said duct on opposite sides of said cavity between said open ends, and control means coupled to said initiating means and to said shutter means for sequentially operating said first and second shutter means so as to stabilize gas pressure in said cavity preparatory to lasing events and utilize pressure waves caused by lasing events to draw fresh lasing medium into said cavity after lasing events.

2. The improvement of claim 1 including gas reconditioning means disposed in said closed loop gas path.

3. The improvement of claim 1 wherein said first shutter means is positioned closer to said lasing cavity than said second shutter means.

4. In a repetitively pulsed gas laser comprising a lasing cavity in a laser duct having open upstream and downstream ends, means for initiating a lasing event in said cavity and means connected to said duct ends for defining a closed loop gas path, a method of pumping the gas medium through the lasing cavity and said closed loop gas path comprising the steps of:
(a) providing first and second shutter means in said laser duct respectively upstream and downstream of said lasing cavity,
(b) with both said shutter means closed, initiating a lasing event in said cavity,
(c) opening said second shutter means thereby opening the downstream end of said duct whereby the pressure wave caused by said lasing event is reflected from said open end of said duct as a rarefaction wave traveling upstream in said cavity,
(d) opening said first shutter means such that said rarefaction wave draws fresh gas medium from said gas path into said cavity through said first shutter means, and then
(e) closing said first and second shutter means thereby stabilizing the gas pressure in said cavity preparatory to initiating a subsequent lasing event.

5. The method of claim 4 including the step of reconditioning the gas as it flows through said closed loop gas path.

6. The method of claim 4 wherein said first shutter means is positioned closer to said lasing cavity than said second shutter means.

7. The method of claim 4 wherein said step of closing said first and second shutter means is accomplished after the passage of the first rarefaction pulse through said first shutter means.

8. The method of claim 4 wherein said step of closing said first and second shutter means is accomplished by leaving said first and second shutter means open after passage of the first rarefaction pulse through said first shutter means and closing both said shutter means after the subsequent compression pulse passes through said second shutter means.

9. The method of claim 4 wherein said step of closing said first and second shutter means is accomplished by leaving said first and second shutter means open after passage of the first rarefaction pulse through said first shutter means and closing both said shutter means before the subsequent compression pulse passes through said second shutter means thereby trapping said compression pulse between said shutter means.

* * * * *